Jan. 17, 1950 W. D. HOUGHTON 2,495,168

CHANNEL UNIT FOR MULTIPLEX SYSTEMS

Filed May 22, 1948 3 Sheets-Sheet 1

INVENTOR
William D. Houghton
BY Harry Tenick
ATTORNEY

Jan. 17, 1950 W. D. HOUGHTON 2,495,168

CHANNEL UNIT FOR MULTIPLEX SYSTEMS

Filed May 22, 1948 3 Sheets-Sheet 2

INVENTOR
William D. Houghton
BY Harry Tunick
ATTORNEY

CHANNEL UNIT FOR MULTIPLEX SYSTEMS

Filed May 22, 1948 3 Sheets-Sheet 3

INVENTOR
William D. Houghton
BY Harry Tunick
ATTORNEY

Patented Jan. 17, 1950 2,495,168

UNITED STATES PATENT OFFICE 2,495,168

CHANNEL UNIT FOR MULTIPLEX SYSTEMS

William D. Houghton, Port Jefferson, N. Y., assignor to Radio Corporation of America, a corporation of Delaware Application May 22, 1948, Serial No. 28,645

9 Claims. (Cl. 179—15)

This invention relates generally to time division multiplex systems wherein the different channel units produce amplitude modulated pulses, and more particularly to the channel unit per se.

As is known, a time division multiplex system is one in which the common output circuit is allotted sequentially to a plurality of channel units for non-overlapping time intervals. One such system mentioned by way of example only, and which describes numerous features mentioned hereinafter in connection with the present invention is described in my copending application Serial No. 608,957, filed August 4, 1945. In this copending application, the timing (occurrence time) of the pulses is modulated rather than the amplitude.

A general object of the present invention is to provide a multi-channel time division multiplex system in which the pulses from the different channels are amplitude modulated by different programs or message waves.

Another object of the invention is to enable channel position selection, pulse production, and modulation to be effected in a simplified circuit employing a minimum number of electrode structures.

Still another object is to provide an improved multi-channel time division system utilizing a step voltage wave distributor for controlling the different channel units to produce amplitude modulated waves.

A further object is to provide an efficient channel unit for use in a time division system, wherein there is little current drain per channel compared to known systems.

A more detailed description of the invention follows in conjunction with a drawing, wherein.

Figures 1, 2:
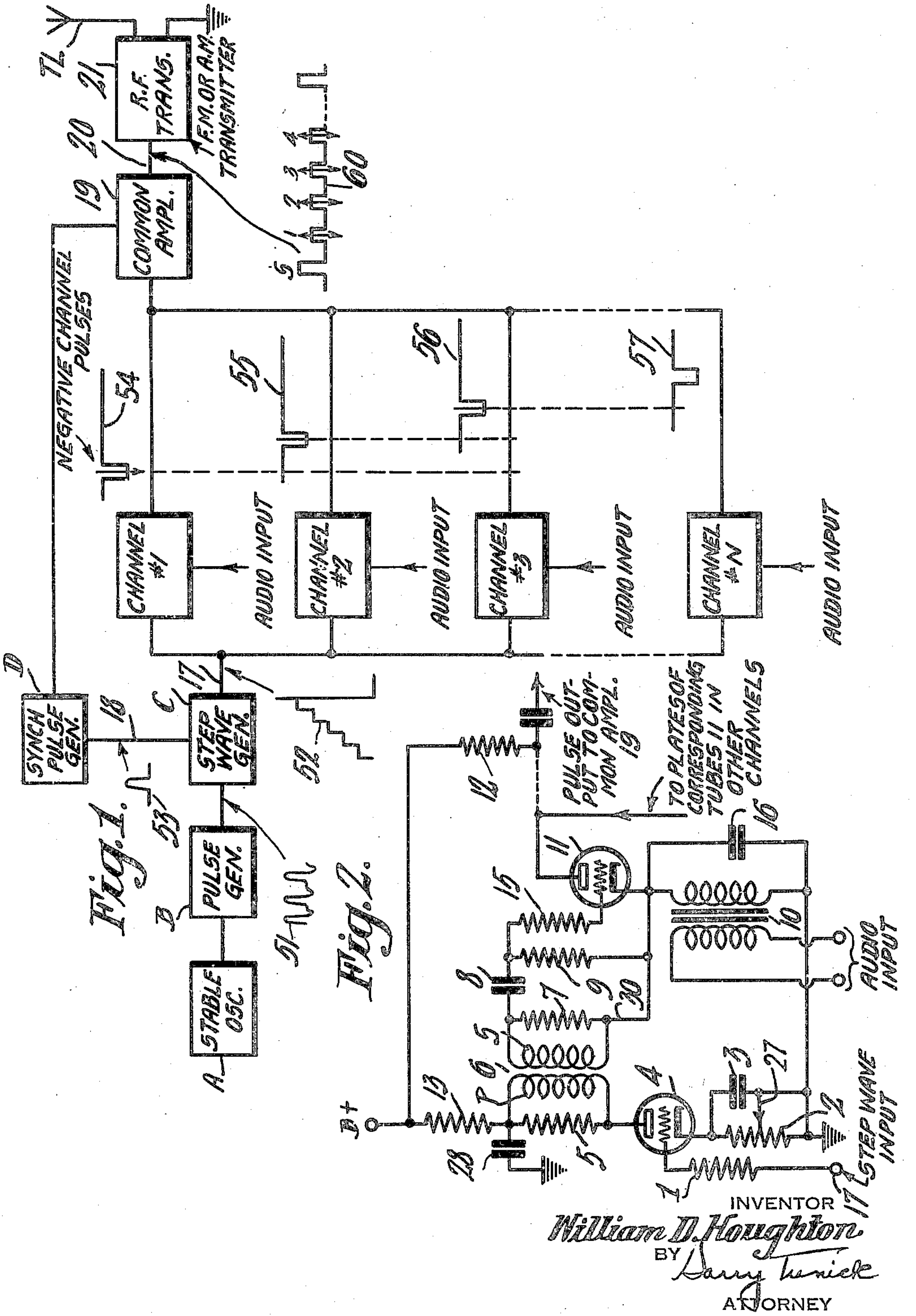
Fig. 1 illustrates, diagrammatically in box form, a complete transmitting system for a pulse type time division multiplex system in which the invention may be employed.
Figs. 2 and 4 show two different embodiments of the channel unit of the invention comprising the combined position selector, pulse generator, and modulator circuit, and employing triode vacuum tubes.
Figure 3A:
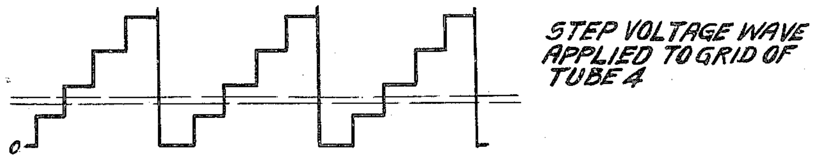
Figures 3B, 3C, 3D, 3E, 3F:
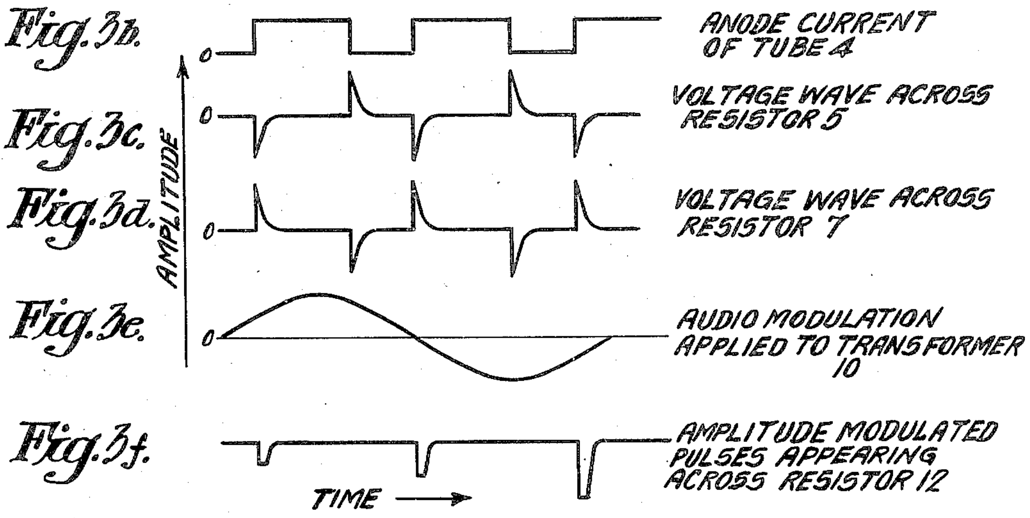
Figure 4:
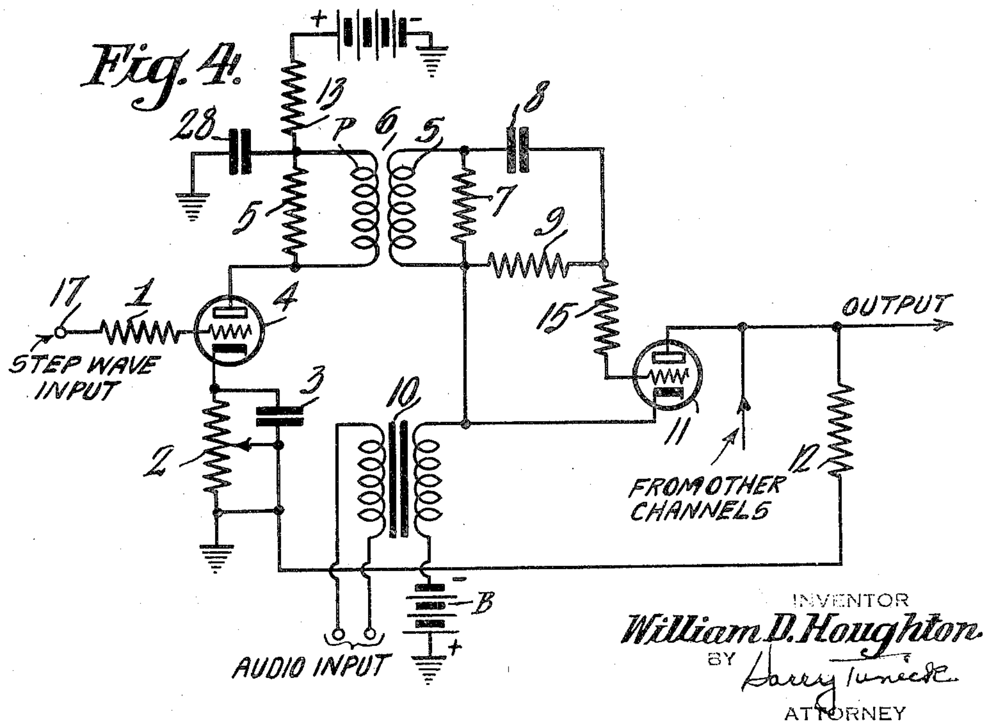
Figures 5, 6:
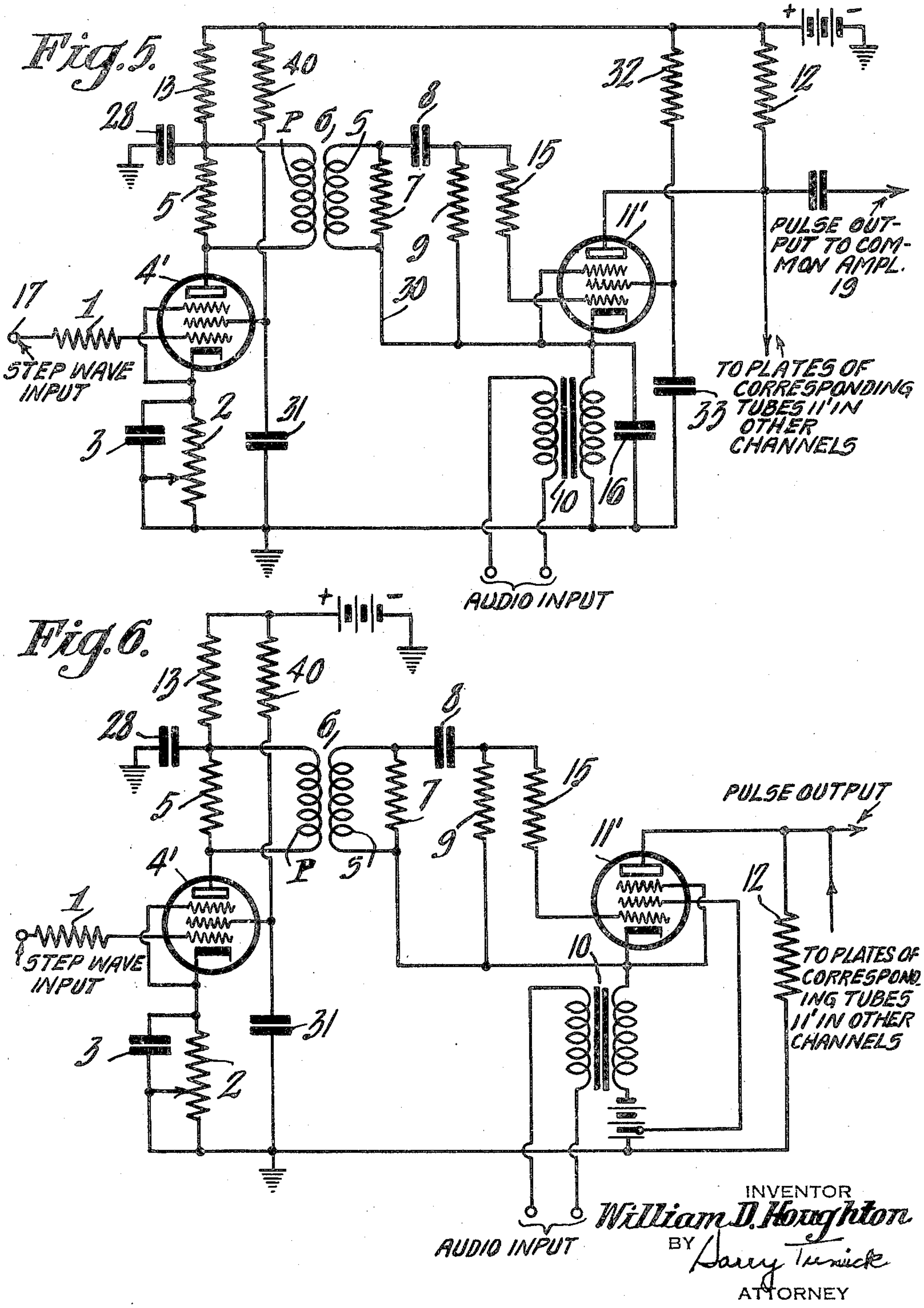

Figs. 3*a* to 3*f* are curves given in explanation of the operation of the circuits of Figs. 2 and 4, respectively; and Figs. 5 and 6 show modifications of the systems of Figs. 2 and 4 respectively, employing pentode vacuum tubes.

Referring to Fig. 1, there is shown a transmitting terminal of a time division multiplex system having a stable frequency oscillator A which locks in a pulse generator B, in turn, feeding a step voltage wave generator C. The step voltage wave generator C has two outputs, one of which has a step voltage wave having a plurality of risers which is supplied to the inputs of a plurality of channel units, 1, 2, 3—N, in parallel relation, over a lead 17. The other output from the step voltage wave generator C is a pulse occurring on the discharge or termination of the step voltage wave and which is fed over lead 18 to a synchronizing pulse generator D. The output synchronizing pulses from D and the amplitude modulated pulses from the channel units are fed to a common amplifier circuit 19 which, in turn, feeds the combined pulses over lead 20 to a radio frequency transmitter 21 whose output is fed to a suitable wave directive structure, such as an antenna TL.

The stable oscillator A produces short duration pulses of current which feed into and lock by injection the short pulse generator B. The pulse generator B may be of the blocking oscillator type and produces short output pulses represented by the waveform 51 which are applied to the step wave generator C. The resulting step voltage wave from the step wave generator C is represented by waveform 52, while the discharge pulse used for controlling the synchronizing pulse generator D is represented by the waveform 53. It will be noted that the step voltage wave 52 produced by the step wave generator comprises a plurality of steps or risers of different voltage values. Stated otherwise, the different risers in the step voltage wave have different voltage values relative to a base line, but these risers preferably have the same or equal amplitude range.

For a more detailed description of the type of circuits which may be used for the stable oscillator A, the pulse generator B, the step wave generator C and the synchronizing pulse generator D, reference is made to my copending application Serial No. 608,957, supra.

The different channel units 1, 2, 3, etc., each comprise a circuit of the type shown in Figs. 2 or 4, preferably that shown in Fig. 2. The different channel units are differently biased to become effective or operative on different risers of the step voltage wave 52. Each channel unit is provided with means for producing pulses therein and for modulating the amplitude of these pulses with a modulation signal. The different channel units are supplied with different modulating signals or audio input waves. It will thus be seen that the outputs from the different channels as indicated by waveforms 54, 55, 56 and 57 (Fig. 1) occur at different time intervals and that for each cycle of operations or frame represented by the duration of a single complete step voltage wave, there will be a negative pulse from each channel unit and these channel pulses occur sequentially. Of course, each frame will also include a synchronizing pulse which occurs at the end of the step voltage wave, or after all of the channels have each produced one pulse. It is preferred that the synchronizing pulse be of longer duration than any of the channel pulses and of an amplitude equal to or slightly greater than the maximum amplitude of any channel pulse under extremes of modulation. Of course, the synchronizing pulse may be lower in amplitude if the receiving equipment is designed to accept it. Also, the synchronizing wave may constitute two or more closely spaced pulses (spaced more closely than any two channel pulses) if desired.

The synchronizing pulse and the channel pulses as they appear in the output of the common amplifier 19 is represented by waveform 60. Thus, each frame or cycle of operations will include a synchronizing pulse and a plurality of channel pulses (positive) one for each channel, suitably spaced apart and occurring sequentially. The arrows on the channel pulses 1, 2, 3, 4—N of waveform 60 indicate that the amplitudes of the channel pulses vary in accordance with the modulation. The synchronizing pulse in waveform 60 is indicated by reference letter S.

The radio frequency transmitter 21 may be any suitable radio frequency oscillator which is modulated by the pulses supplied thereto. It is preferred that this transmitter be a frequency modulation transmitter whose frequency is modulated in accordance with the amplitude of the pulses in lead 20. If desired, the amplitude of the carrier waves produced by the transmitter 21 may, as an alternative, be modulated in accordance with the amplitude of the pulses in lead 20.

Referring to Fig. 2 which shows one of the channel units in the multiplex system of Fig. 1, there are shown a pair of vacuum tube triode circuits 4 and 11, illustrated as individual tubes, although both electrode structures may be included in a single evacuated envelope. The grid of triode 4 is supplied with the step voltage wave from lead 17 through a grid current limiting resistor 1. The anode of triode 4 is supplied with a positive anode polarizing potential from terminal B+ of a source of unidirectional potential through resistors 5 and 13. The cathode of triode 4 is connected to ground through a resistor 2 across which there is provided a bypass condenser 3. A suitable tap 27 serves to adjust the bias on the triode 4. Another bypass condenser 28 is connected between ground and the junction point of the resistors 5 and 13 and serves to bypass the alternating current components of anode current. Normally, triode 4 is non-conductive. The tap point 27 is so arranged that the triode 4 becomes conductive on a particular riser of the applied step voltage wave appearing on lead 17. As mentioned before, the different triodes 4 in the different channel units are differently biased to become conducting on different risers of the step voltage wave.

A differentiating type transformer 6 has one of its windings P connected across resistor 5 and its other winding S coupled to the grid of tube 11 through a blocking condenser 8 in series with a grid limiting resistor 15, and to the cathode over lead 30. The winding S is shunted by a resistor 7. Resistors 5 and 7 are damping resistors which critically damp transformer 6 and cause a single pulse to be developed across resistor 7 each time tube 4 conducts.

The amplitude of the riser of the step voltage wave on which each channel unit is designed to become effective or operative, is sufficient to drive tube 4 from below cut-off to zero grid-to-cathode potential. Once tube 4 becomes conductive, it will remain conductive for the duration of the applied step wave, and the grid-to-cathode potential will be zero for the remainder of the applied step wave. That is, the anode current of tube 4 will rise from zero to a maximum on a given riser and remain at this maximum for the remainder of the step voltage wave applied via lead 17.

Tube 11 is normally biased to the anode current cut-off condition due to grid leak bias developed across resistor 9. The cathode of triode 11 is connected to ground through the secondary winding of an audio transformer 10. This secondary winding is bypassed by a condenser 16 which is a low value capacitor in order to bypass only the pulse frequency and maintain the cathode of tube 11 at ground potential for the pulse frequencies during the pulse time. The intelligence modulating signal or message wave for the channel unit is applied to the primary winding of audio transformer 10, as shown.

In the operation of the system of Fig. 2, the flow of current through tube 4 upon the occurrence of a particular riser of the applied step voltage wave, causes the voltage on the anode of tube 4 to drop to a low value and remain at this value for the remainder of the step wave cycle. When tube 4 conducts, the anode current rises from zero to some maximum value which it maintains for the remainder of the step wave cycle. The rapid rate of change of anode current through winding P of transformer 6 causes a voltage to be developed across resistor 5. The differentiating type of transformer 6 provides a short pulse as a result of this current change. A pulse of opposite polarity is developed across winding S and hence across resistor 7. The pulse produced across resistor 7, caused by the conduction of tube 4 is of positive polarity and sufficient magnitude to overcome the cut-off bias on tube 11, as a result of which tube 11 conducts and forms a low impedance path between the secondary winding of audio transformer 10 and the common output resistor 12. Tube 11 will remain conducting for the remainder of the pulse across resistor 7. When tube 11 conducts, grid current flows through this tube and charges condenser 8 as a result of which a negative voltage is developed between the grid and cathode of tube 11 during the time this tube is cut off. The purpose of resistor 15 is to limit the peak positive voltage between the cathode and grid of tube 11 to zero.

If the voltage developed across the secondary winding of transformer 10 due to the audio input modulation is a maximum in the positive direction at the time tube 11 conducts, the pulse across resistor 12 will be a minimum in amplitude, whereas if the voltage developed across the secondary winding of audio transformer 10 due to the audio input is a maximum in the negative direction, the pulse across resistor 12 will be a maximum in amplitude. The voltage developed across resistor 12 appears as a series of negative going pulses, due to the fact that tube 11, when it conducts, forms a low impedance between audio transformer 10 and resistor 12. The repetition rate of the negative going pulses across resistor 12 is equal to that of the step wave input applied to the grid of tube 4 and should be at least twice the highest audio frequency to be passed. The amplitude of the pulses across resistor 12 varies in accordance with the amplitude of the audio modulation signal applied to transformer 10. Tube 11 may be considered as a single pole-single throw switch between one end of the secondary winding of transformer 10 and the resistor 12. This switch is closed for a period of time equal to the duration of the pulse across resistor 7.

The curves of Fig. 3a to 3f illustrate waveforms which appear at various points in the circuit of Fig. 2 upon the application of the step voltage wave to the grid of tube 4. It is assumed that the channel unit of Fig. 2 is biased to conduct on the second riser of the applied step voltage wave. This step voltage wave is illustrated in Fig. 3a. The lower horizontal line through the second riser of the step voltage wave represents the conducting level or critical threshold bias of tube 4, while the upper horizontal line of Fig. 3a represents the zero grid-to-cathode potential point of tube 4. Fig. 3b indicates the anode current of tube 4. It should be noted that the anode current commences to flow at a time corresponding to the second riser of the step wave of Fig. 3a and ceases at a time corresponding to the termination of the step wave of Fig. 3a. The curve of Fig. 3c represents the voltage wave developed across resistor 5. It should be noted that the voltage wave of Fig. 3c comprises sharp pulses of current as a result of the differentiating action of transformer 6. The resulting wave across resistor 7 is shown in Fig. 3d and comprises pulses which are the inverse of the pulses of Fig. 3c. Fig. 3e shows a sine wave representing the audio input modulation or intelligence signal applied to the primary winding of transformer 10. The resulting amplitude modulated pulses in the output of tube 11 are shown in the curve of Fig. 3f. It will be apparent, from what has been stated above, that during the operation of the multiplex system, the pulses from the other channel units would occupy the space between the adjacent pulses in Fig. 3f.

It should be noted that in the operation of the channel unit of Fig. 2, the audio modulation is applied to the cathode of tube 11 and not to the grid, as in prior systems. Hence, the applied modulation does not cause tube 11 to conduct. Tube 11 is caused to conduct only when the tube 4 passes current and produces a pulse across the secondary winding S of differentiating type transformer 6 of a positive polarity and of sufficient magnitude to cause tube 11 to conduct. This arrangement eliminates the need for the use of audio limiting circuits to prevent over modulation which results in cross-talk between channels.

Fig. 4 is a modification of the system of Fig. 1 and shows an alternative type of channel unit. The selector tube 4 is identical with that shown in Fig. 2. The modulation tube 11 has its cathode returned to the negative terminal of an auxiliary voltage supply B. Resistor 12 in Fig. 4 constitutes the anode resistor for tube 11 and is tied down to ground, thus eliminating the necessity of using a blocking condenser in the anode circuit of tube 11 as shown in Fig. 2. The operation of the system of Fig. 4 is substantially the same as that described above for Fig. 2, in which tube 11 acts as an infinite impedance until the time tube 4 becomes conducting. When tube 4 becomes conducting a positive pulse is developed on the grid of tube 11, causing tube 11 to conduct and form a low impedance path between resistor 12 and audio transformer 10.

The invention possesses the following advantages: (1) When the applied modulation is greater than the normal value it does not cause tube 11 to conduct; (2) The current drain per channel is small; and (3) The circuit arrangement is quite simple and requires only two triode electrode structures per channel. These triode electrode structures may form a single twin triode type vacuum tube.

In Fig. 5 is shown one way in which pentode tubes may be used to replace the triode tubes. This circuit is identical in operation to that of Fig. 2. The same parts appearing in Figs. 2 and 5 have been given the same reference numerals while equivalent parts in Fig. 5 have been given a prime designation. A screen dropping resistor 40 and bypass condenser 31 have been added to provide the proper screen potential for tube 4 and a screen dropping resistor 32 and bypass condenser 33 have been added to provide the desired screen potential for tube 11.

In Fig. 6 is shown the manner in which pentode tubes may be used to replace the triodes in Fig. 4. Again a screen dropping resistor 40 and a bypass condenser 31 have been added to provide the proper screen potential for tube 4'. The screen grid of tube 11' is shown returned to a potential slightly lower than that of the plate in order to obtain the desired screen grid to cathode potential. Pentode tubes would be used in systems involving a large number of channels where the interelectrode capacities of triode tubes might become too large and hence prevent the desired pulse build up time from being obtained.

What is claimed is:

1. A pulse generating system comprising a first electron discharge electrode structure biased to cut-off and having an input electrode and an output electrode, a second electron discharge device electrode structure also biased to cut-off and having a cathode and a grid, a differentiator circuit coupled between the output electrode of said first structure and the grid-cathode circuit of said second electrode structure, a transformer having a winding in the cathode circuit of said second electrode structure, a source of modulation coupled to said transformer, and means coupled to said first structure for applying recurring waves thereto of such magnitude and polarity as to periodically overcome the cut-off bias on said first structure.

2. A pulse generating system comprising a first electron discharge electrode structure biased to cut-off and having a cathode, a grid and an anode, a second electron discharge device electrode structure also biased to cut-off and having a cathode and a grid, a differentiating transformer having one winding in the anode circuit of said first electrode structure and another winding coupled between the grid and cathode of a second electrode structure, a bypass condenser between the cathode of said first electrode structure and ground, means for applying audio modulating voltages to the cathode of said second electrode structure, and means for applying recurring waves to the grid of said first structure of such magnitude and polarity as to periodically overcome the cut-off bias on said first structure.

3. A pulse generating system comprising a first electron discharge electrode structure biased to cut-off and having a cathode, a grid and an anode, a second electron discharge device electrode structure also biased to cut-off and having a cathode and a grid, a differentiating transformer having one winding in the anode circuit of said first electrode structure and another winding coupled between the grid and cathode of a second electrode structure, damping resistors across said windings of said differentiating transformer, a bypass condenser between the cathode of said first electrode structure and ground, means for applying audio modulating voltages to the cathode of said second electrode structure, and means for applying recurring waves to the grid of said first structure of such magnitude and polarity as to periodically overcome the cut-off bias on said first structure.

4. A pulse generating system comprising a first electron discharge electrode structure biased to cut-off, a second electron discharge device electrode structure also biased to cut-off, a differentiator circuit coupled between said first and second structures and responsive to the flow of current in said first structure for overcoming the cut-off bias of said second structure, said second electrode structure having an anode and a cathode, an audio transformer having one winding in the cathode circuit of said second structure and another winding adapted to be coupled to a circuit for applying modulating potential thereto, an output circuit coupled to said anode, and means coupled to said first structure for applying recurring waves thereto of such magnitude and polarity as to periodically overcome the cut-off bias on said first structure.

5. A pulse generating system comprising a first electron discharge electrode structure biased to cut-off, a second electron discharge device electrode structure also biased to cut-off, a differentiator circuit coupled between said first and second structures and responsive to the flow of current in said first structure for overcoming the cut-off bias of said second structure, said second electrode structure having an anode and a cathode, a load resistor connected to the anode of said second structure and across which a pulse of voltage is developed when said second structure becomes conductive, means for applying modulating potential to the cathode of said second structure, and means coupled to said first structure for applying recurring waves thereto of such magnitude and polarity as to periodically overcome the cut-off bias on said first structure.

6. In a pulse generating multiplex system, a plurality of channel circuits, a source of recurring waves coupled to and controlling said channel circuits to produce sequentially occurring amplitude-modulated pulses, each of said channel circuits including: a first normally non-conductive vacuum tube electrode structure biased to become conductive at a particular region of the recurring wave, a second normally non-conductive vacuum tube electrode structure having a cathode, a differentiator circuit coupling said structures and controlling said second structure to become conductive for only a portion of the time of conductivity of said first structure, and a source of modulating potential coupled to the cathode of said second structure; the first electrode structures of the different channel circuits being differently biased, and a pulse combining circuit coupled in common to the output electrodes of the second structures of said channel circuits.

7. A pulse generating system comprising a first triode biased to cut-off, a second triode also biased to cut-off, a resistor connecting the anode of said first triode and the positive terminal of a source of anode polarizing potential, a resistor shunted by a condenser connected between the cathode of said first triode and ground, a differentiating transformer having one winding coupled across said first resistor, another winding for said transformer, a connection including the series circuit of a condenser and a resistor from one point on said other winding to the grid of said second triode, a connection from another point on said other winding to the cathode of said second triode, a damping resistor across said other winding, a resistor connected between the cathode of said second triode and the junction point of said condenser and resistor in said series circuit, an inductance coil shunted by a condenser connected between the cathode of said second triode and ground, a source of modulating potential coupled to said inductance coil, and means for applying recurring waves to the grid of said first triode of such magnitude and polarity as to periodically overcome the cut-off bias on said first triode.

8. A pulse generating system comprising a first triode biased to cut-off, a second triode also biased to cut-off, a resistor connecting the anode of said first triode and the positive terminal of a source of anode polarizing potential, a bypass condenser coupled between a point on said resistor removed from said anode and ground, a resistor shunted by a condenser connected between the cathode of said first triode and ground, a differentiating transformer having one winding coupled across said first resistor, another winding for said transformer, a connection including the series circuit of a condenser and a resistor from one point on said other winding to the grid of said second triode, a connection from another point on said other winding to the cathode of said second triode, a damping resistor across said other winding, a resistor connected between the cathode of said second triode and the junction point of said condenser and resistor in said series circuit, an inductance coil shunted by a condenser connected between the cathode of said second triode and ground, a source of modulating potential coupled to said inductance coil, a load resistor coupled between the positive terminal of said source of polarizing potential and the anode of said second triode and across which a pulse of voltage is developed when said second triode becomes conductive, and means for applying recurring waves to the grid of said first triode of such magnitude and polarity as to periodically overcome the cut-off bias on said first triode.

9. A pulse generating system comprising a first triode biased to cut-off, a second triode also biased to cut-off, a resistor connecting the anode of said first triode and the positive terminal of a source of anode polarizing potential, a resistor shunted by a condenser connected between the cathode of said first triode and ground, a differentiating transformer having one winding coupled across said first resistor, another winding for said transformer, a connection including the series circuit of a condenser and a resistor from one point on said other winding to the grid of said second triode, a connection from another point on said other winding to the cathode of said second triode, a damping resistor across said other winding, a resistor connected between the cathode of said second triode and the junction point of said condenser and resistor in said series circuit, an inductance coil connected between the cathode of said second triode and the negative terminal of a source of unidirectional potential whose positive terminal is grounded, a resistor coupled between the anode of said second triode and ground and across which a pulse of voltage is developed when said second triode becomes conductive, and means for applying recurring waves to the grid of said first triode of such magnitude and polarity as to periodically overcome the cut-off bias on said first triode.

WILLIAM D. HOUGHTON.

REFERENCES CITED

The following references are of record in the file of this patent:

UNITED STATES PATENTS

| Number | Name | Date |
|---|---|---|
| 2,413,440 | Farrington | Dec. 31, 1946 |
| 2,415,920 | Thomas | Feb. 18, 1947 |